US011817735B2

(12) United States Patent
Onaka et al.

(10) Patent No.: US 11,817,735 B2
(45) Date of Patent: Nov. 14, 2023

(54) CHARGING DEVICE THAT CAN OPTIMIZE CHARGING CURRENT OF A SECONDARY BATTERY

(71) Applicant: FDK CORPORATION, Tokyo (JP)

(72) Inventors: Tomoki Onaka, Tokyo (JP); Yukio Ono, Tokyo (JP); Norio Fukui, Tokyo (JP)

(73) Assignee: FDK CORPORATION, Tokyo (JP)

( * ) Notice: Subject to any disclaimer, the term of this patent is extended or adjusted under 35 U.S.C. 154(b) by 507 days.

(21) Appl. No.: 16/480,659

(22) PCT Filed: Jan. 31, 2018

(86) PCT No.: PCT/JP2018/003261

§ 371 (c)(1),
(2) Date: Jul. 24, 2019

(87) PCT Pub. No.: WO2018/143290

PCT Pub. Date: Aug. 9, 2018

(65) Prior Publication Data

US 2019/0372383 A1 Dec. 5, 2019

(30) Foreign Application Priority Data

Feb. 1, 2017 (JP) .................................. 2017-016948

(51) Int. Cl.
*H02J 7/02* (2016.01)
*H02J 7/00* (2006.01)
*H02M 3/137* (2006.01)

(52) U.S. Cl.
CPC ............. *H02J 7/007* (2013.01); *H02M 3/137* (2013.01); *H02J 2207/20* (2020.01)

(58) Field of Classification Search
CPC ...................................................... H02J 7/022
See application file for complete search history.

(56) References Cited

U.S. PATENT DOCUMENTS

2013/0027983 A1\* 1/2013 Nate ...................... H02M 3/335
363/21.01
2013/0307467 A1\* 11/2013 Carletti .................... H02J 7/00
323/282

(Continued)

FOREIGN PATENT DOCUMENTS

JP H08182219 A 7/1996
JP 10-14127 A 1/1998

(Continued)

OTHER PUBLICATIONS

English translation of International Search Report dated Mar. 13, 2018, for corresponding PCT Application No. PCT/JP2018/003261.

*Primary Examiner* — Yalkew Fantu
(74) *Attorney, Agent, or Firm* — Kinney & Lange, P.A.

(57) ABSTRACT

A charging device of the present invention includes a DC-DC converter, a charging circuit that charges a secondary battery, a power supply voltage detecting circuit that detects an input voltage Ve, an output voltage setting circuit that sets an output voltage of the DC-DC converter, and a charging control section that controls the charging circuit and the output voltage setting circuit based on the input voltage Ve, and the charging control section increases the output voltage of the DC-DC converter by a predetermined voltage in a stepwise manner while monitoring the input voltage Ve, and in a case where the input voltage Ve is decreased to a first threshold voltage Vth1 or less before the output voltage of the DC-DC converter increases to a rated charging voltage, the charging control section keeps the output voltage of the DC-DC converter at a voltage that is one step lower than a voltage at a time point of the case.

4 Claims, 8 Drawing Sheets

(56) References Cited

U.S. PATENT DOCUMENTS

| | | | | |
|---|---|---|---|---|
| 2014/0160804 A1* | 6/2014 | Sato | ................. | H02M 3/33507 |
| | | | | 363/21.01 |
| 2014/0160808 A1* | 6/2014 | Sato | ................. | H02M 3/33507 |
| | | | | 363/21.02 |
| 2017/0149333 A1* | 5/2017 | Uno | ..................... | H02M 3/156 |

FOREIGN PATENT DOCUMENTS

| JP | 2006014526 A | 1/2006 |
|---|---|---|
| JP | 2006129619 A | 5/2006 |
| JP | 2013123333 A | 6/2013 |

\* cited by examiner

| DECIMAL NUMBER | BINARY NUMBER | HEXADECIMAL NUMBER | CURRENT(A) |
|---|---|---|---|
| 15 | 1111 | F | 4.00 |
| 14 | 1110 | E | 3.72 |
| 13 | 1101 | D | 3.46 |
| 12 | 1100 | C | 3.19 |
| 11 | 1011 | B | 2.93 |
| 10 | 1010 | A | 2.66 |
| 9 | 1001 | 9 | 2.39 |
| 8 | 1000 | 8 | 2.13 |
| 7 | 111 | 7 | 1.86 |
| 6 | 110 | 6 | 1.60 |
| 5 | 101 | 5 | 1.33 |
| 4 | 100 | 4 | 1.06 |
| 3 | 11 | 3 | 0.80 |
| 2 | 10 | 2 | 0.53 |
| 1 | 1 | 1 | 0.27 |
| 0 | 0 | 0 | 0.00 |

FIG. 5

| DECIMAL NUMBER | BINARY NUMBER | HEXADECIMAL NUMBER | CURRENT(A) |
|---|---|---|---|
| 63 | 111111 | 3F | 4.00 |
| 62 | 111110 | 3E | 3.94 |
| 61 | 111101 | 3D | 3.87 |
| 60 | 111100 | 3C | 3.81 |
| 59 | 111011 | 3B | 3.75 |
| 58 | 111010 | 3A | 3.68 |
| 57 | 111001 | 39 | 3.62 |
| 56 | 111000 | 38 | 3.56 |
| 55 | 110111 | 37 | 3.49 |
| 54 | 110110 | 36 | 3.43 |
| 53 | 110101 | 35 | 3.37 |
| 52 | 110100 | 34 | 3.30 |
| 51 | 110011 | 33 | 3.24 |
| 50 | 110010 | 32 | 3.17 |
| 49 | 110001 | 31 | 3.11 |
| 48 | 110000 | 30 | 3.05 |
| 47 | 101111 | 2F | 2.98 |
| 46 | 101110 | 2E | 2.92 |
| 45 | 101101 | 2D | 2.86 |
| 44 | 101100 | 2C | 2.79 |
| 43 | 101011 | 2B | 2.73 |
| 42 | 101010 | 2A | 2.67 |
| 41 | 101001 | 29 | 2.60 |
| 40 | 101000 | 28 | 2.54 |
| 39 | 100111 | 27 | 2.48 |
| 38 | 100110 | 26 | 2.41 |
| 37 | 100101 | 25 | 2.35 |
| 36 | 100100 | 24 | 2.29 |
| 35 | 100011 | 23 | 2.22 |
| 34 | 100010 | 22 | 2.16 |
| 33 | 100001 | 21 | 2.10 |
| 32 | 100000 | 20 | 2.03 |
| 31 | 11111 | 1F | 1.97 |
| 30 | 11110 | 1E | 1.90 |
| 29 | 11101 | 1D | 1.84 |
| 28 | 11100 | 1C | 1.78 |
| . | . | . | . |
| . | . | . | . |
| . | . | . | . |
| 4 | 100 | 4 | 0.25 |
| 3 | 11 | 3 | 0.19 |
| 2 | 10 | 2 | 0.13 |
| 1 | 1 | 1 | 0.06 |
| 0 | 0 | 0 | 0.00 |

FIG. 6

| DECIMAL NUMBER | BINARY NUMBER | HEXADECIMAL NUMBER | CURRENT(A) |
|---|---|---|---|
| 255 | 11111111 | FF | 4.000000 |
| 254 | 11111110 | FE | 3.984314 |
| 253 | 11111101 | FD | 3.968627 |
| 252 | 11111100 | FC | 3.952941 |
| 251 | 11111011 | FB | 3.937255 |
| 250 | 11111010 | FA | 3.921569 |
| 249 | 11111001 | F9 | 3.905882 |
| 248 | 11111000 | F8 | 3.890196 |
| 247 | 11110111 | F7 | 3.874510 |
| 246 | 11110110 | F6 | 3.858824 |
| 245 | 11110101 | F5 | 3.843137 |
| 244 | 11110100 | F4 | 3.827451 |
| 243 | 11110011 | F3 | 3.811765 |
| 242 | 11110010 | F2 | 3.796078 |
| 241 | 11110001 | F1 | 3.780392 |
| 240 | 11110000 | F0 | 3.764706 |
| 239 | 11101111 | EF | 3.749020 |
| 238 | 11101110 | EE | 3.733333 |
| 237 | 11101101 | ED | 3.717647 |
| 236 | 11101100 | EC | 3.701961 |
| 235 | 11101011 | EB | 3.686275 |
| 234 | 11101010 | EA | 3.670588 |
| 233 | 11101001 | E9 | 3.654902 |
| 232 | 11101000 | E8 | 3.639216 |
| 231 | 11100111 | E7 | 3.623529 |
| 230 | 11100110 | E6 | 3.607843 |
| 229 | 11100101 | E5 | 3.592157 |
| 228 | 11100100 | E4 | 3.576471 |
| 227 | 11100011 | E3 | 3.560784 |
| 226 | 11100010 | E2 | 3.545098 |
| 225 | 11100001 | E1 | 3.529412 |
| 224 | 11100000 | E0 | 3.513725 |
| 223 | 11011111 | DF | 3.498039 |
| 222 | 11011110 | DE | 3.482353 |
| 221 | 11011101 | DD | 3.466667 |
| 220 | 11011100 | DC | 3.450980 |
| . | . | . | . |
| . | . | . | . |
| . | . | . | . |
| 4 | 100 | 4 | 0.062745 |
| 3 | 11 | 3 | 0.047059 |
| 2 | 10 | 2 | 0.031373 |
| 1 | 1 | 1 | 0.015686 |
| 0 | 0 | 0 | 0 |

CHARGING DEVICE THAT CAN OPTIMIZE CHARGING CURRENT OF A SECONDARY BATTERY

CROSS-REFERENCE TO RELATED APPLICATION(S)

This application is the national phase of PCT Application No. PCT/JP2018/003261 filed on Jan. 31, 2018, which in turn claims priority to Japanese Application No. 2017-016948 filed on Feb. 1, 2017, both of which are incorporated herein by reference in their entireties.

BACKGROUND

Technical Field

The present disclosure relates to a charging device of a secondary battery such as a nickel metal hydride secondary battery.

Background Art

Secondary batteries such as a nickel metal hydride secondary battery are capable of being repeatedly used by being charged, and are widely used in various fields. In a charging device that charges a secondary battery like this, it is necessary to control a charging voltage and a charging current properly in charging the secondary battery. In order to complete charging of the secondary battery in as short a time as possible, it is desirable to perform charging with as large a charging current as possible, within the range in which the secondary battery is not deteriorated.

However, an input power supply that supplies power to the charging device that charges the secondary battery does not always have a constant power supply capacity in many cases. For example, when the input power supply also supplies power to another device, and a load of the other device can fluctuate, maximum power that can be supplied to the charging device can fluctuate. Consequently, when the secondary battery is configured to be always charged with a maximum charging current of a magnitude capable of charging in a shortest time, in the charging device, for example, there arises a fear that when the power supply capacity of the input power supply becomes insufficient and a voltage of the input power supply drops, a charging voltage of a minimum necessary voltage cannot be obtained, and charging of the secondary battery has to be interrupted.

As an example of a prior art with an object of solving the problem like this, a power supply device is known to the public which adjusts an output current characteristic (voltage droop start current) of a DC-DC converter in response to a fluctuation of the voltage of a solar cell or the like which is an input power supply, when charging a secondary battery with the output voltage of the DC-DC converter (refer to Patent Document 1, for example). Further, as another prior art, a charging device is known to the public that performs arithmetic operation processing of determining whether charging of the secondary battery can be continued with a present charging current when detecting reduction in the input voltage during charging of the secondary battery, and sets the charging current at a low value by changing setting of an arithmetic operation amplifying circuit of charging current control means in response to the arithmetic operation processing result (refer to Patent Document 2, for example).

PRIOR ART DOCUMENT

Patent Document

Patent Document 1: Japanese Patent Laid-Open No. 2006-014526
Patent Document 2: Japanese Patent Laid-Open No. 2006-129619

SUMMARY

The above described prior arts each have a problem that compactification and reduction in cost of the charging device are difficult because the device configuration is large and a control procedure is also complicated.

The present disclosure is made in the light of the situation like this, and an object of the present disclosure is to realize compactification and reduction in cost of a charging device capable of continuing charging of a secondary battery even when a power supply capacity of an input power supply fluctuates.

The present disclosure provides a charging device including a DC-DC converter that converts a voltage of DC power which is supplied from an input power supply, a charging circuit that charges a secondary battery with a DC voltage that is outputted by the DC-DC converter, a power supply voltage detecting circuit that detects a voltage of the input power supply, an output voltage setting circuit that sets an output voltage of the DC-DC converter, and a control device that controls the charging circuit and the output voltage setting circuit, based on the voltage of the input power supply, wherein the control device increases the output voltage of the DC-DC converter by a predetermined voltage in a stepwise manner while monitoring the voltage of the input power supply, and in a case where the voltage of the input power supply is decreased to a first threshold or less before the output voltage of the DC-DC converter increases to a rated charging voltage, the control device keeps the output voltage of the DC-DC converter at a voltage that is one step lower than a voltage at a time point of the case.

According to the present disclosure, compactification and reduction in cost of the charging device capable of continuing charging of a secondary battery even when the power supply capacity of the input power supply fluctuates can be realized.

DETAILED DESCRIPTION

Hereinafter, an embodiment of the present disclosure will be described with reference to the drawings.

Note that it goes without saying that the present invention is not specially limited to the embodiment described as follows, and various modifications can be made within the range of the invention described in the claims.

Configuration of Charging Device 10

A configuration of a charging device 10 according to the present disclosure will be described with reference to FIG. 1 to FIG. 4.

Figure 1:
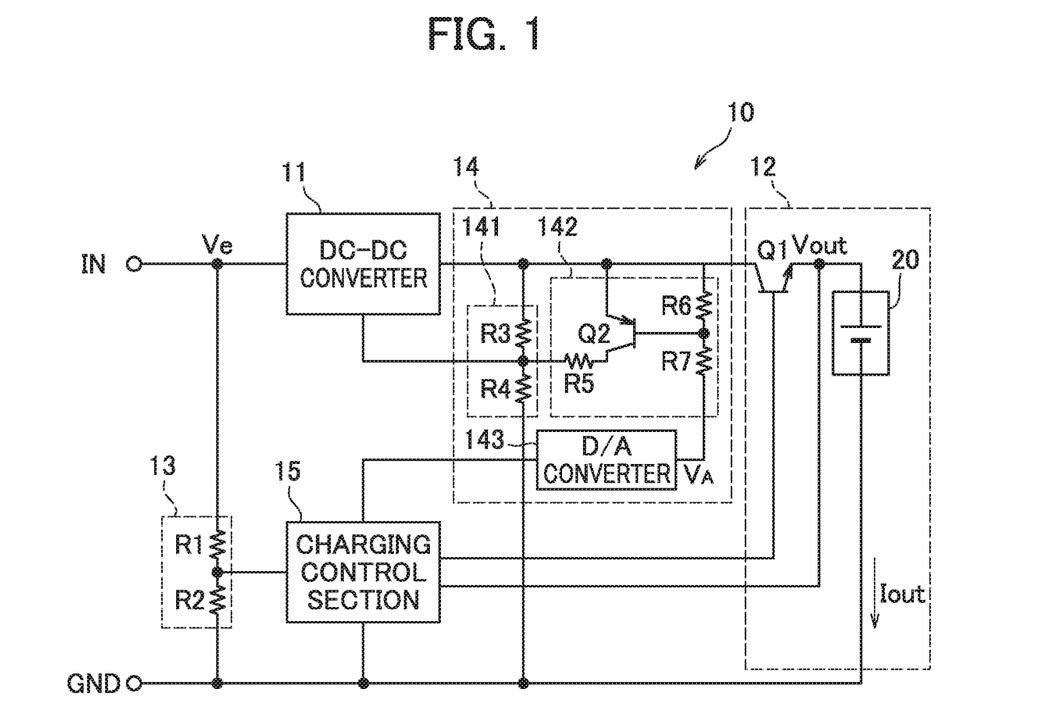
FIG. 1 is a circuit diagram illustrating a configuration of a charging device according to the present disclosure.

FIG. 1 is a circuit diagram illustrating the configuration of the charging device 10 according to the present disclosure.

The charging device 10 includes a DC-DC converter 11, a charging circuit 12, a power supply voltage detecting circuit 13, an output voltage setting circuit 14, and a charging control section 15. A secondary battery 20 is, for example, a secondary battery such as a nickel metal hydride secondary battery.

The DC-DC converter 11 converts a voltage of a DC power that is supplied from an input power supply (not illustrated) that is connected to an input terminal IN and a ground terminal GND. More specifically, the DC-DC converter 11 is a step-down converter that drops an input voltage Ve and outputs a constant voltage. The DC-DC converter 11 is not specially limited to a step-down converter, but may be a step-up converter, or a step-up/step-down converter, for example.

The charging circuit 12 is a circuit that charges the secondary battery 20 with a DC voltage that is outputted by the DC-DC converter 11, and includes a transistor Q1. The transistor Q1 is a semiconductor switch that opens and closes a charging path from the DC-DC converter 11 to the secondary battery 20, and is an NPN type bipolar transistor in the embodiment. In the transistor Q1, a collector is connected to an output of the DC-DC converter 11, and an emitter is connected to a positive pole of the secondary battery 20. Further, the transistor Q1 has a base connected to the charging control section 15, and is controlled to be turned on/off by the charging control section 15.

The power supply voltage detecting circuit 13 is a circuit that detects the input voltage Ve, and is a voltage divider circuit including two resistors R1 and R2. The resistor R1 has one end connected to the input terminal IN, and the other end connected to one end of the resistor R2. The other end of the resistor R2 is connected to the ground terminal GND. A connection point of the resistor R1 and the resistor R2 is connected to the charging control section 15.

The output voltage setting circuit 14 is a circuit that sets an output voltage of the DC-DC converter 11, and includes a voltage divider circuit 141, a voltage division ratio changing circuit 142 and a digital-to-analog (DA) converter 143.

The divider circuit 141 is a circuit that divides the output voltage of the DC-DC converter 11, and includes two resistors R3 and R4. The resistor R3 has one end connected to the output of the DC-DC converter 11, and the other end connected to one end of the resistor R4. The other end of the resistor R4 is connected to the ground terminal GND. A connection point (voltage division point) of the resistor R3 and the resistor R4 is connected to a feedback control terminal of the DC-DC converter 11. The DC-DC converter 11 controls the output voltage so that the voltage of the connection point of the resistor R3 and the resistor R4 is kept at a predetermined voltage.

The voltage division ratio changing circuit 142 is a circuit that changes a voltage division ratio of the voltage divider circuit 141, and includes three resistors R5 to R7 and a transistor Q2. The resistor R5 has one end connected to the connection point of the resistor R3 and the resistor R4, and has the other end connected to a collector of the transistor Q2. The resistor R6 has one end connected to the output of the DC-DC converter 11, and the other end connected to one end of the resistor R7. The other end of the resistor R7 is connected to an analog output terminal of the DA converter 143. The transistor Q2 is a PNP type bipolar transistor in the embodiment. In the transistor Q2, a collector is connected to the other end of the resistor R5, an emitter is connected to the output of the DC-DC converter 11, and a base is connected to a connection point of the resistor R6 and the resistor R7.

The DA converter 143 that controls the voltage division ratio changing circuit 142 receives a digital signal that is outputted by the charging control section 15, converts the digital signal into an analog signal and outputs the analog signal.

The charging control section 15 is a microcomputer control device known to the public, and is a control device that executes charging control of the secondary battery 20. The charging control section 15 further controls the charging circuit 12 and the output voltage setting circuit 14 based on the input voltage Ve. More specifically, the charging control section 15 executes on/off control of the transistor Q1, and base current control of the transistor Q2, based on a voltage at the connection point of the resistor R1 and the resistor R2.

Figure 2:
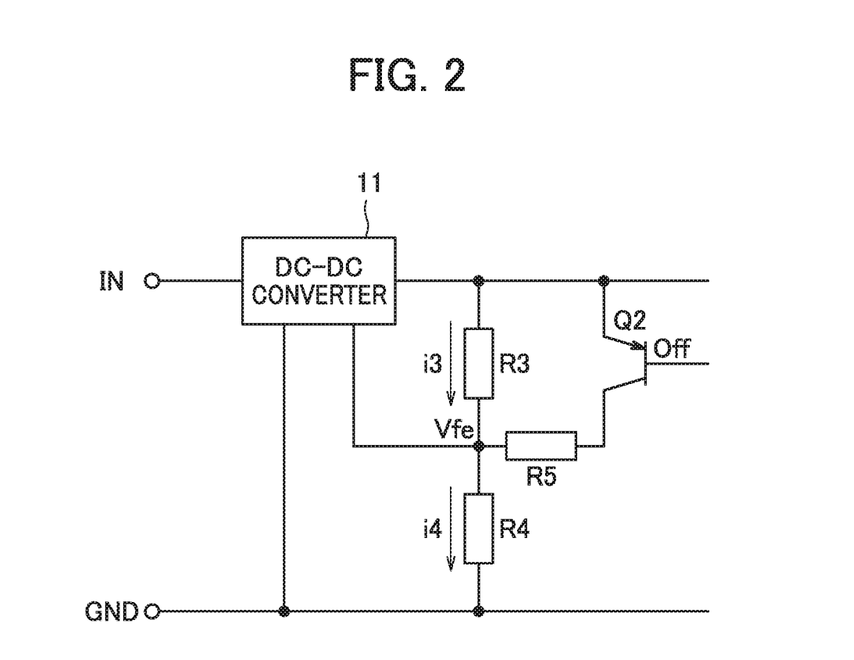
FIG. 2 is a circuit diagram illustrating part of an output voltage setting circuit.
Figure 3:
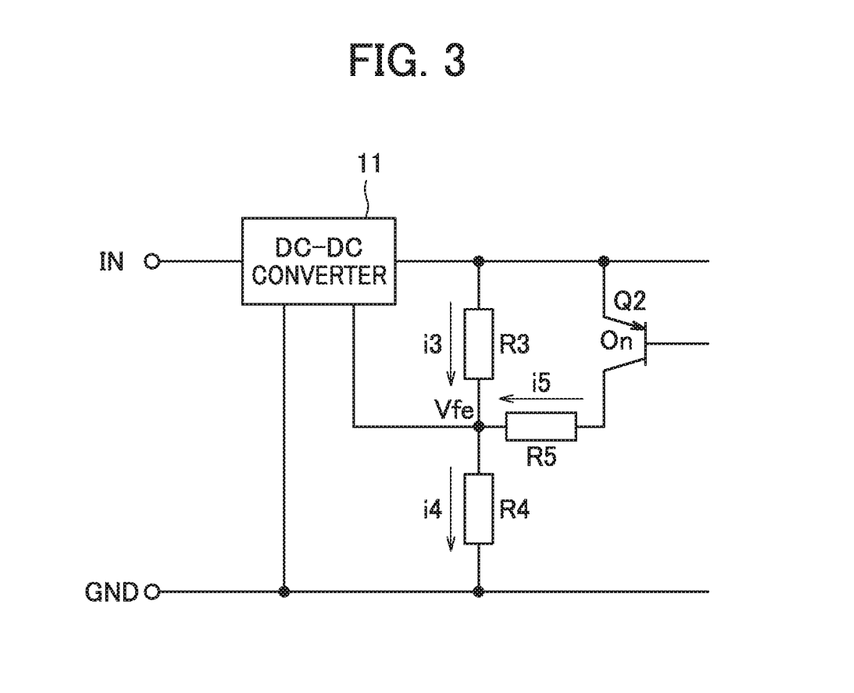
FIG. 3 is a circuit diagram illustrating the part of the output voltage setting circuit.

FIG. 2 and FIG. 3 are circuit diagrams each illustrating an essential part of the output voltage setting circuit 14, FIG. 2 illustrates a state where the transistor Q2 is turned off, and FIG. 3 illustrates a state where the transistor Q2 is turned on respectively.

A current i3 is a current that flows in the resistor R3. A current i4 is a current that flows in the resistor R4. A current i5 is a current that flows in the resistor R5. A voltage Vfe is a voltage at the connection point of the resistor R3 and the resistor R4. As described above, the DC-DC converter 11 controls the output voltage so that the voltage Vfe at the voltage division point (the connection point of the resistor R3 and the resistor R4) of the voltage divider circuit 141 is kept at a constant voltage. The output voltage of the DC-DC converter 11 at a time of charging the secondary battery 20, that is, a charging voltage Vout is expressed by expression (1) as follows.

$$V\text{out} = R3 \times i3 + V\!fe \quad (1)$$

In a state where the transistor Q2 is off (FIG. 2), i3=i4 is established. Further, the voltage Vfe is expressed by expression (2) as follows.

$$V\!fe = R4 \times i4 \quad (2)$$

On the other hand, in a state where the transistor Q2 is on (FIG. 3), the charging current of the secondary battery 20 is under constant current control. Then i4=i3+i5 is established, and therefore the voltage Vfe is expressed by expression (3) as follows.

$$Vfe = R4 \times (i3+i5) \qquad (3)$$

The DC-DC converter 11 controls the output voltage so that the voltage Vfe at the voltage division point of the voltage divider circuit 141 is kept at a constant voltage, so that when the current i5 decreases as a base current $I_{Q2B}$ of the transistor Q2 decreases, the current i3 increases thereby. When the current i3 increases, the charging voltage Vout increases correspondingly.

Figure 4:
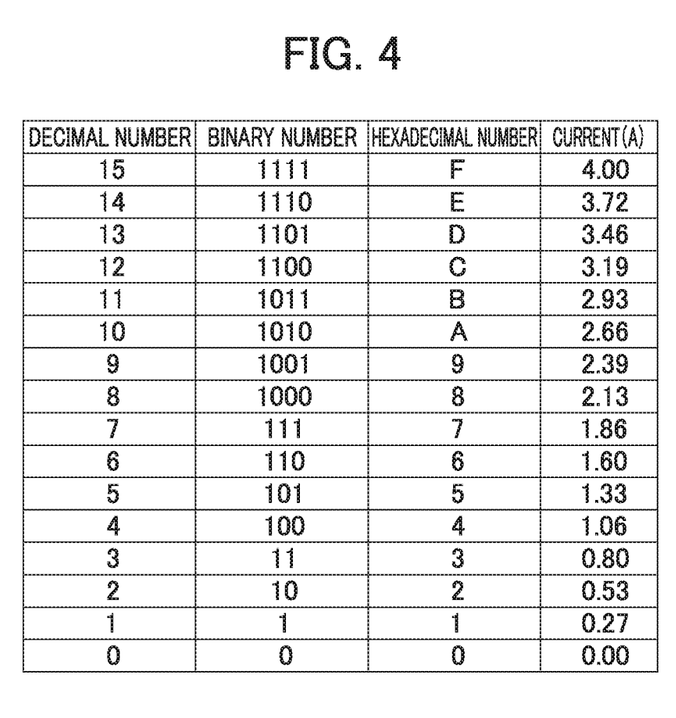
FIG. 4 is a table showing a relationship between a digital input value of a digital-to-analog (DA) converter and a charging current of a secondary battery.
Figure 5:
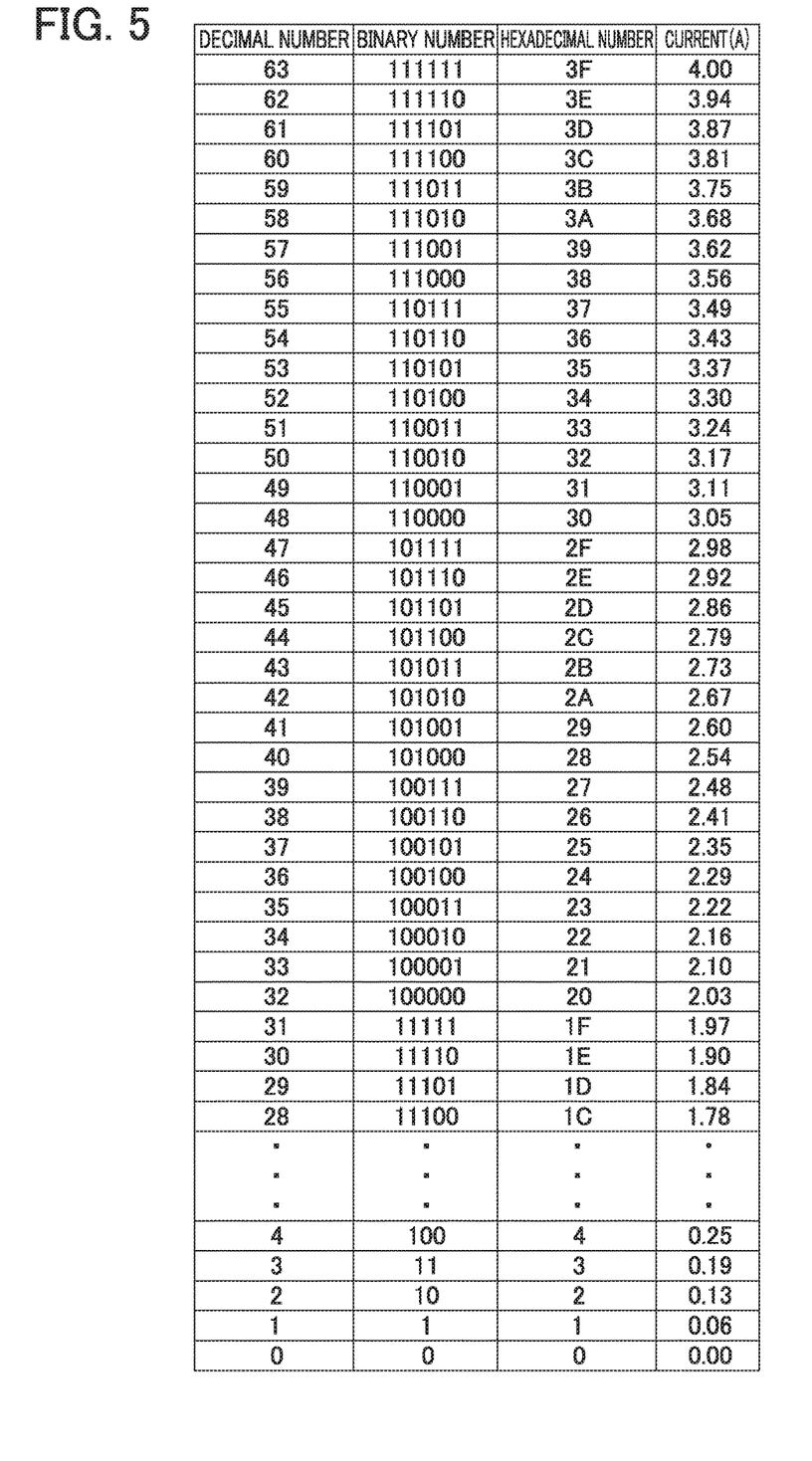
FIG. 5 is a table showing a relationship between a digital input value of the DA converter and a charging current of the secondary battery.
Figure 6:
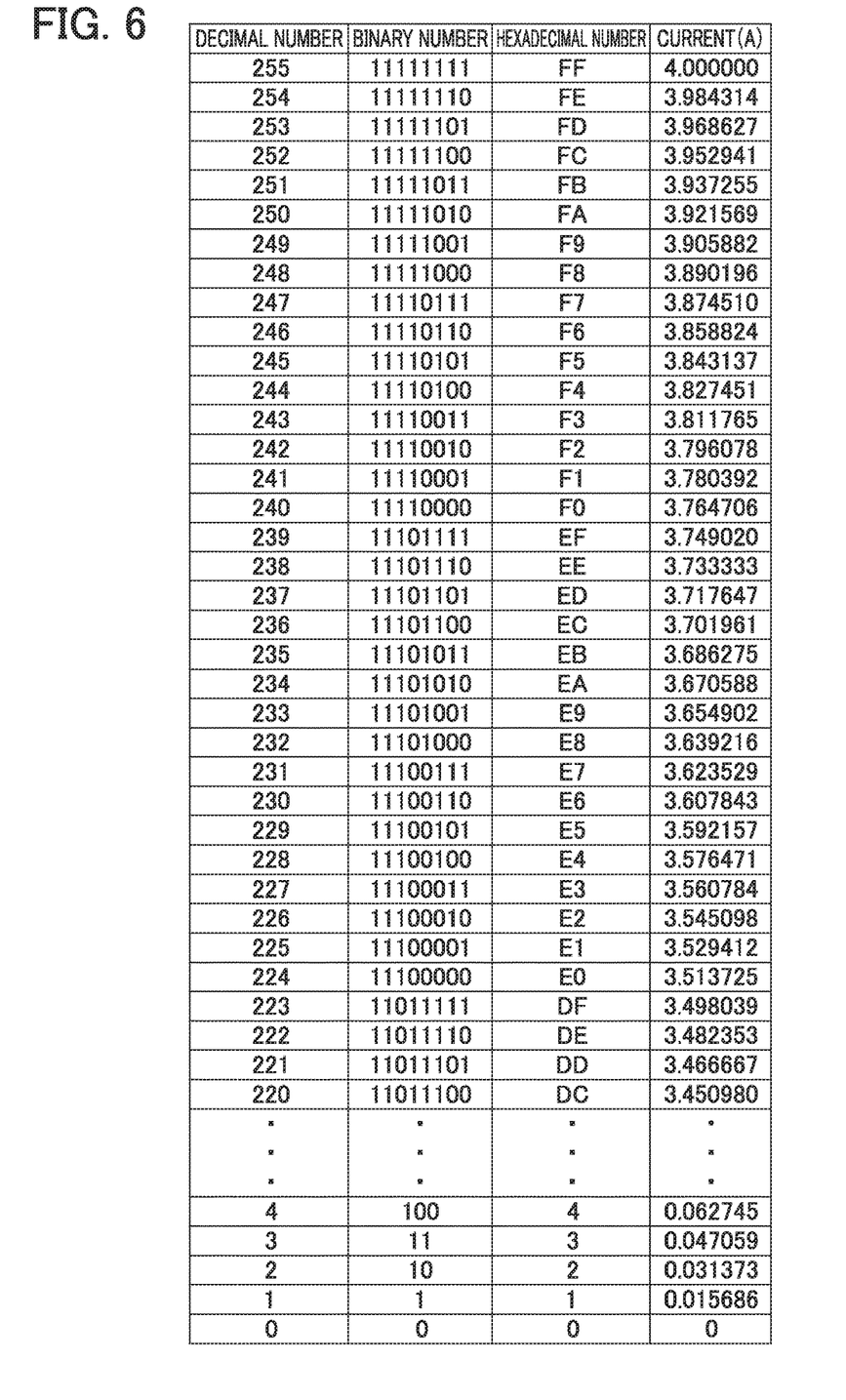
FIG. 6 is a table showing a relationship between a digital input value of the DA converter and a charging current of the secondary battery.

FIG. 4 to FIG. 6 are tables each showing a relationship between a digital input value of the DA converter 143 and a charging current Iout of the secondary battery 20.

FIG. 4 is an example of a case of using the DA converter 143 of four bits.

The DA converter 143 has an output voltage of 0 V in a state where the digital input value is zero, and therefore the transistor Q2 is in a state of being on (FIG. 3). As the digital input value of the DA converter 143 is incremented by one bit, the base current $I_{Q2B}$ of the transistor Q2 decreases in a stepwise manner. As the digital input value is incremented by one bit, the output voltage of the DC-DC converter 11 increases by a voltage which is 1/15 of a rated voltage in the stepwise manner. Thereby, the charging current Iout of the secondary battery 20 increases by a current of 1/15 of a maximum value in the stepwise manner, and increases by approximately 0.267 A when the maximum value of the charging current Iout of the secondary battery 20 is set as 4 A, for example.

FIG. 5 is an example of a case of using the DA converter 143 of six bits.

In this case, the output voltage of the DC-DC converter 11 increases by a voltage of 1/63 of a rated voltage in a stepwise manner, as the digital input value is incremented by one bit. Thereby the charging current Iout of the secondary battery 20 increases by a current of 1/63 of the maximum value in a stepwise manner, and increases by approximately 0.063 A when the maximum value of the charging current Iout of the secondary battery 20 is set as 4 A, for example.

FIG. 6 is an example of a case of using the DA converter 143 of eight bits.

In this case, the output voltage of the DC-DC converter 11 increases by a voltage of 1/255 of the rated voltage in a stepwise manner, as the digital input value is incremented by one bit. Thereby, the charging current Iout of the secondary battery 20 increases by a current of 1/255 of the maximum value in a stepwise manner, and increases by approximately 0.015686 A when a maximum value of the charging current Iout of the secondary battery 20 is 4 A, for example.

Operation of Charging Device 10

An operation of the charging device 10 will be described with reference to FIG. 7 to FIG. 9.

Figure 7:
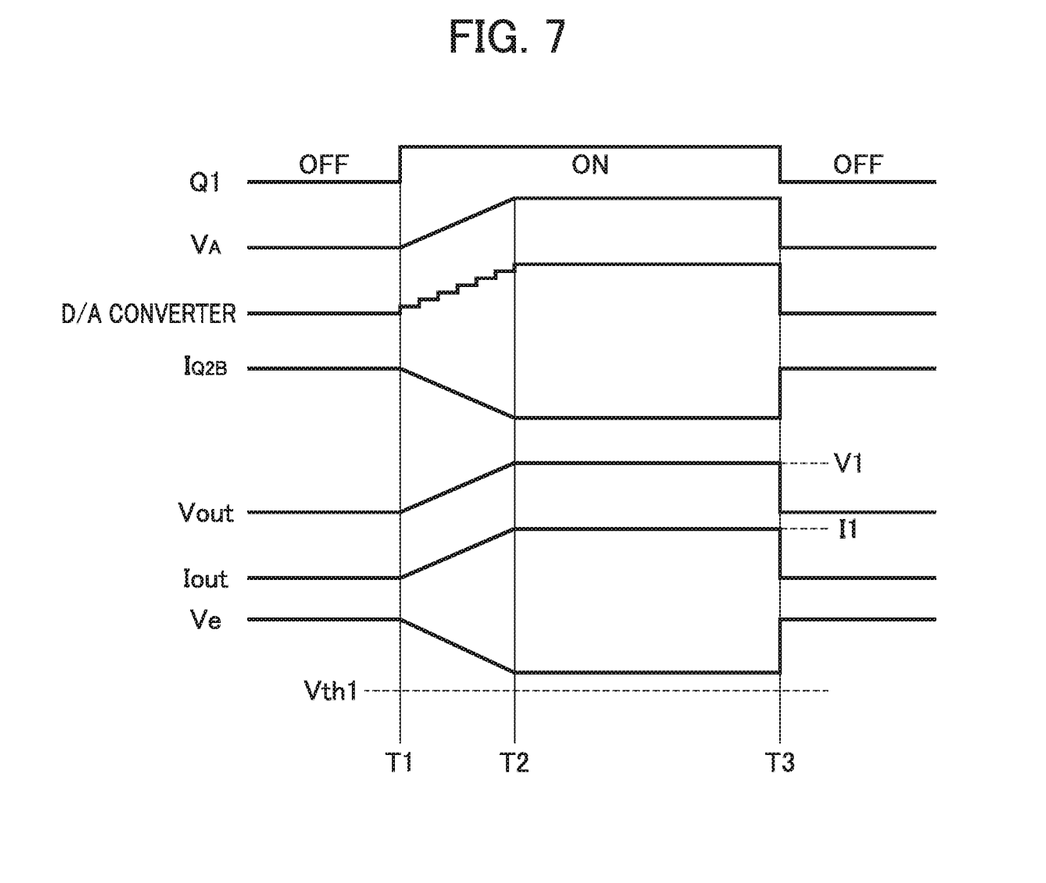
FIG. 7 is a timing chart illustrating an example of charging control in a case where power supply capacity of the input power supply has a sufficient margin.

FIG. 7 is a timing chart illustrating the operation of the charging device 10, and illustrates an example of charging control in a case where the power supply capacity of the input power supply has a sufficient margin.

The charging control section 15 increases the charging voltage Vout (output voltage of the DC-DC converter 11) by a predetermined voltage in a stepwise manner while monitoring the input voltage Ve. More specifically, the charging control section 15 sets the digital input value of the DA converter 143 at zero and turns on the transistor Q1 in a state where a charging control voltage $V_A$ is decreased (timing T1). Thereby, the base current $I_{Q2B}$ of the transistor Q2 becomes maximum, so that the charging voltage Vout and the charging current Iout start to operate at minimum values. The charging control section 15 increments the digital input value of the DA converter 143 by one bit to increase the charging control voltage $V_A$ in a stepwise manner. Thereby, the base current $I_{Q2B}$ of the transistor Q2 decreases in a stepwise manner. The charging voltage Vout of the secondary battery 20 increases in a stepwise manner while the charging current Iout increases in a stepwise manner, and the input voltage Ve decreases.

When the power supply capacity of the input power supply has a sufficient margin, the charging voltage Vout of the secondary battery 20 increases to a rated charging voltage V1 before the input voltage Ve decreases to a first threshold voltage Vth1 or lower, and thereby the charging current Iout of the secondary battery 20 increases to a maximum charging current I1 (timing T2). Accordingly, the secondary battery 20 is charged with the maximum charging current I1. Here, the maximum charging current I1 is a maximum value of the charging current Iout that can be passed in a range in which the secondary battery 20 is not deteriorated, for example, and is a current of a magnitude capable of charging the secondary battery 20 in a shortest time. In other words, the charging device 10 is configured so that the charging current Iout of the secondary battery 20 becomes the maximum charging current I1 when the output voltage of the DC-DC converter 11 is the rated charging voltage V1.

The charging control section 15 detects a charging state of the secondary battery 20 from a temperature of the secondary battery 20 which is detected by a temperature sensor (not illustrated) such as a thermistor, for example, during charging of the secondary battery 20, that is, while the transistor Q1 is on. The charging control section 15 turns off the transistor Q1 and ends charging of the secondary battery 20 at a time point when the charging state of the secondary battery 20 is fully charged (timing T3). When the power supply capacity of the input power supply has a sufficient margin like this, the secondary battery 20 can be charged with the maximum charging current I1, so that the secondary battery 20 can be fully charged in the shortest time period.

Figure 8:
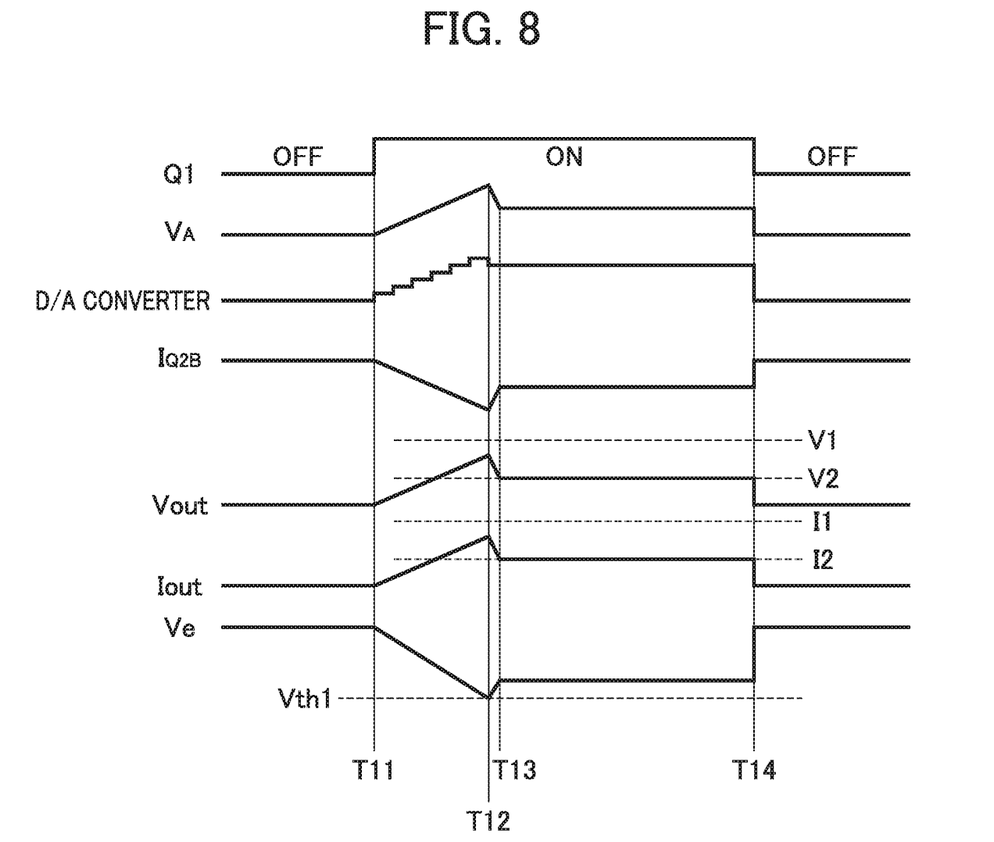
FIG. 8 is a timing chart illustrating an example of charging control in a case where the power supply capacity of the input power supply is insufficient.

FIG. 8 is a timing chart illustrating the operation of the charging device 10, and illustrates an example of charging control in a case where the power supply capacity of the input power supply is insufficient.

The charging control section 15 sets the digital input value of the DA converter 143 at zero and turns on the transistor Q1 in a state where the charging control voltage $V_A$ is decreased (timing T11). When the charging control section 15 increments the digital input value of the DA converter 143 by one bit to increase the charging control voltage $V_A$ in a stepwise manner, the base current $I_{Q2B}$ of the transistor Q2 decreases in a stepwise manner. Thereby, the charging voltage Vout of the secondary battery 20 increases in a stepwise manner while the charging current Iout increases in a stepwise manner, and the input voltage Ve decreases. When the power supply capacity of the input power supply is insufficient, the input voltage Ve decreases to the first threshold voltage Vth1 or less, before the charging voltage Vout of the secondary battery 20 increases to the rated charging voltage V1 (timing T12).

The first threshold voltage Vth1 is for detecting a state where the power supply capacity of the input power supply is insufficient in charging the secondary battery 20 with constant current, with the rated charging voltage V1 and the maximum charging current I1. Therefore, the first threshold voltage Vth1 is set at a same voltage as or a higher voltage than a lower limit of the input voltage of the DC-DC converter 11 capable of outputting the rated charging voltage V1, for example.

In a case where the input voltage Ve decreases to the first threshold Vth1 or less before the charging voltage Vout increases to the rated charging voltage, the charging control section 15 keeps the charging voltage Vout at a voltage which is one step lower than the voltage at a time point of the case. More specifically, at the time point when the input voltage Ve decreases to the first threshold voltage Vth1 or less (timing T12), the charging control section 15 stops increase of the charging control voltage $V_A$, and returns the digital input value of the DA converter 143 to a value one bit earlier (timing T13). Thereby, the charging voltage Vout is kept at a charging voltage V2 that is lower than the rated charging voltage V1, and the charging current Iout of the secondary battery 20 is kept at a charging current I2 which is lower than the maximum charging current I1.

In other words, when the power supply capacity of the input power supply becomes insufficient and the input voltage Ve decreases to the first threshold voltage Vth1 or less, the charging voltage V2 which is lower than the rated charging voltage V1 is set so that the charging current Iout of the secondary battery 20 is limited to the charging current I2 which is lower than the maximum charging current I1, and charging of the secondary battery 20 is continuously performed. Thereby, for the secondary battery 20, constant current charging is performed with the charging current I2 which is lower than the maximum charging current I1. The charging control section 15 turns off the transistors Q1 and Q2 to end charging of the secondary battery 20 at a time point when the charging state of the secondary battery 20 is fully charged (timing T14).

When the power supply capacity of the input power supply is decreased in this way, the largest possible charging current (charging current I2) of the power supply capacity of the input power supply is kept and charging of the secondary battery 20 can be continued, although the charging time period increases correspondingly to a decrease amount of the power consumed by charging of the secondary battery 20. This reduces the possibility that the charging voltage Vout of the secondary battery 20 decreases below a minimum necessary voltage and charging of the secondary battery 20 has to be interrupted, when the power supply capacity of the input power supply is decreased, so that charging of the secondary battery 20 can be continued even if the power supply capacity of the input power supply fluctuates.

In this way, the charging device 10 according to the present disclosure has a simple configuration in which when the power supply capacity of the input power supply is decreased, the output voltage of the DC-DC converter 11 is set to be variable in response to decrease in the input voltage Ve so that the charging current of the secondary battery 20 is limited to the charging current I2 which is lower than the maximum charging current I1. Consequently, according to the present disclosure, the charging device 10 which can continue charging of the secondary battery 20 even when the power supply capacity of the input power supply fluctuates can be configured to be compact at low cost. Further, since the charging device 10 according to the present disclosure has a configuration in which the output voltage of the DC-DC converter 11 is set to be variable in response to decrease in the input voltage Ve, a resistor and a circuit that detect the charging current Iout are not required. Consequently, component cost can be significantly reduced. Thereby, a loss that occurs due to the resistor that detects the charging current Iout can also be reduced, so that the charging device 10 with higher efficiency can be realized.

Further, the charging device 10 according to the present disclosure can set the output voltage of the DC-DC converter 11 to be variable with the extremely simple circuit configuration, so that further compactification and reduction in cost can be realized. Further, the charging current Iout of the secondary battery 20 can be accurately determined from the digital input value of the DA converter 143, so that charging control of the secondary battery 20 can be performed with high precision.

Figure 9:
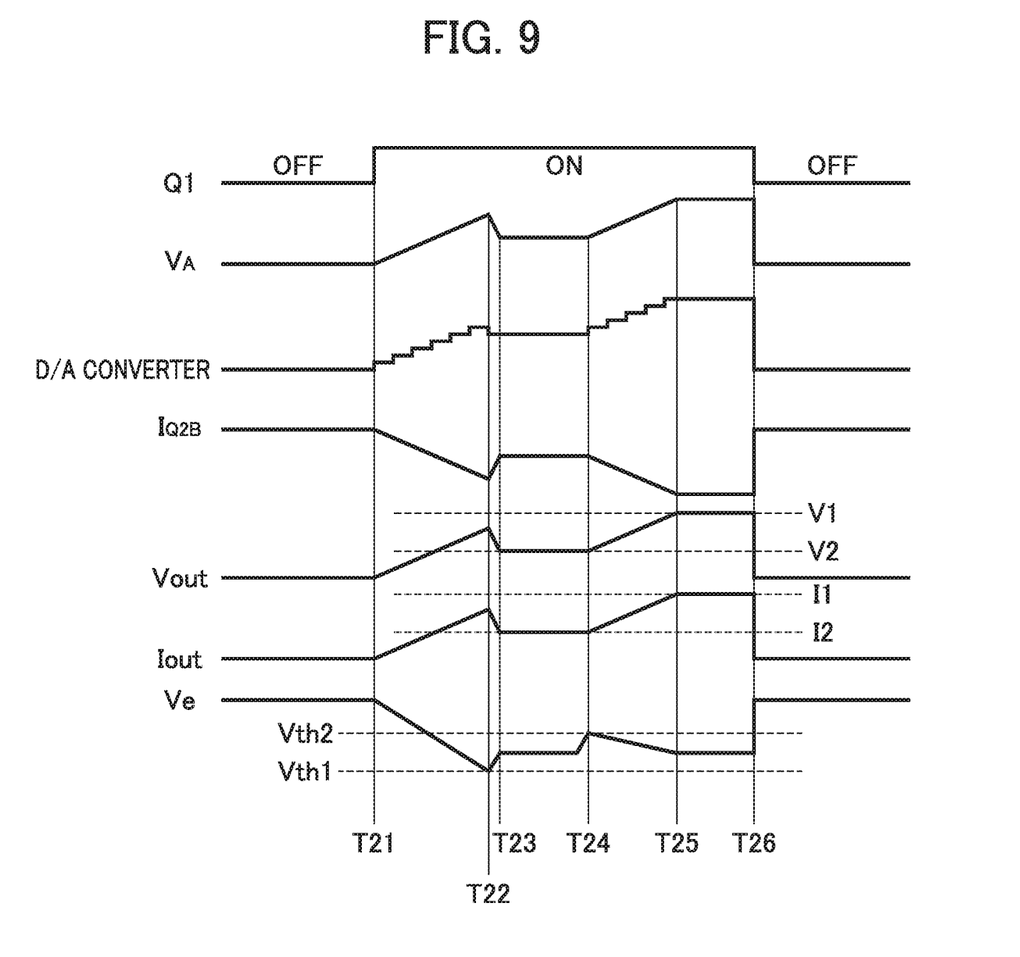
FIG. 9 is a timing chart illustrating an example of charging control in a case where the power supply capacity of the input power supply is restored during charging of the secondary battery.

FIG. 9 is a timing chart illustrating the operation of the charging device 10, and illustrates an example of charging control in a case where the power supply capacity of the input power supply is restored during charging of the secondary battery 20.

The charging control section 15 sets the digital input value of the DA converter 143 at zero and turns on the transistor Q1 in the state where the charging control voltage $V_A$ is decreased (timing T21). When the charging control section 15 increments the digital input value of the DA converter 143 by one bit to increase the charging control voltage $V_A$ in a stepwise manner, the base current $I_{Q2B}$ of the transistor Q2 decreases in a stepwise manner. Thereby, the charging voltage Vout of the secondary battery 20 increases in a stepwise manner while the charging current Iout increases in a stepwise manner, and the input voltage Ve decreases. When the power supply capacity of the input power supply is insufficient, the input voltage Ve decreases to the first threshold voltage Vth1 or less, before the charging voltage Vout of the secondary battery 20 increases to the rated charging voltage V1 (timing T22).

At a time point when the input voltage Ve is decreased to the first threshold voltage Vth1 or less (Timing T22), the charging control section 15 stops increase of the charging control voltage $V_A$, and returns the digital input value of the DA converter 143 to a value one bit earlier (timing T23). Thereby, the charging voltage Vout is kept at the charging voltage V2 which is lower than the rated charging voltage V1, and he charging current Iout of the secondary battery 20 is kept at the charging current I2 which is lower than the maximum charging current I1.

When the power supply capacity of the input power supply is restored, and the input voltage Ve increases to a second threshold voltage Vth2 or more, before the charging state of the secondary battery 20 is fully charged, the charging control section 15 increments the digital input value of the DA converter 143 by one bit again to increase the charging control voltage $V_A$ in a stepwise manner (timing T24). In other words, in a state where the charging voltage Vout is kept at the charging voltage V2 which is lower than the rated charging voltage V1, the charging control section 15 increases the output voltage of the DC-DC converter 11 by a predetermined voltage in a stepwise manner, on condition that the input voltage Ve increases to the second threshold voltage Vth2 or more which is higher than the first threshold voltage Vth1.

Thereby, the base current $I_{Q2B}$ of the transistor Q2 decreases in a stepwise manner. The charging current Iout increases in a stepwise manner as the charging voltage Vout of the secondary battery 20 increases in the stepwise manner, and the input voltage Ve decreases. When the power supply capacity of the input power supply has a sufficient margin, the charging voltage Vout of the secondary battery 20 increases to the rated charging voltage V1 before the input voltage Ve decreases to the first threshold voltage Vth1 or less, and thereby the charging current Iout of the secondary battery 20 increases to the maximum charging current I1 (timing T25). Accordingly, the secondary battery 20 is charged with the maximum charging current I1. The charging control section 15 turns off the transistor Q1 to end charging of the secondary battery 20 at a time point when the charging state of the secondary battery 20 is fully charged (timing T26).

The second threshold voltage Vth2 is for detecting that the power supply capacity of the input power supply is restored to such an extent that the secondary battery 20 can be charged with constant current, with the rated charging voltage V1 and the maximum charging current I1. Therefore, the second threshold voltage Vth2 is set at a voltage equal to or larger than at least the first threshold voltage Vth1, and is preferably set at a voltage higher than the first threshold voltage Vth1.

Even when the power supply capacity of the input power supply is insufficient and charging of the secondary battery 20 is performed with the charging voltage V2 in this way, if the power supply capacity of the input power supply is restored during charging and the input voltage Ve increases to the second threshold voltage Vth2 or more, it is preferable to increase the output voltage of the DC-DC converter 11 by a predetermined voltage in a stepwise manner. Thereby, when the power supply capacity of the input power supply is restored, when the secondary battery 20 is charged by limiting the charging current Iout of the secondary battery 20 to the charging current I2 which is lower than the maximum charging current I1, the charging current Iout of the secondary battery 20 increases to the maximum charging current I1 in a stepwise manner. Accordingly, the charging current Iout is automatically set flexibly and properly in response to the fluctuation of the power supply capacity of the input power supply and the secondary battery 20 can be charged.

Aspects of Present Disclosure

A first aspect of the present disclosure is a charging device including a DC-DC converter that converts a voltage of a DC power which is supplied from an input power supply, a charging circuit that charges a secondary battery with a DC voltage that is outputted by the DC-DC converter, a power supply voltage detecting circuit that detects a voltage of the input power supply, an output voltage setting circuit that sets an output voltage of the DC-DC converter, and a control device that controls the charging circuit and the output voltage setting circuit, based on the voltage of the input power supply, wherein the control device increases the output voltage of the DC-DC converter by a predetermined voltage in a stepwise manner while monitoring the voltage of the input power supply, and in a case where the voltage of the input power supply is decreased to a first threshold or less before the output voltage of the DC-DC converter increases to a rated charging voltage, the control device keeps the output voltage of the DC-DC converter at a voltage that is one step lower than a voltage at a time point of the case.

When the output voltage of the DC-DC converter is increased by the predetermined voltage in the stepwise manner while the voltage of the input power supply is monitored, the charging current of the secondary battery thereby increases by a predetermined current in a stepwise manner. When the power supply capacity of the input power supply has sufficient margin, the output voltage of the DC-DC converter increases to the rated charging voltage, and charging of the secondary battery is performed with the maximum charging current.

On the other hand, when the power supply capacity of the input power supply does not have sufficient margin, the voltage of the input power supply decreases to the first threshold voltage or less before the output voltage of the DC-DC converter increases to the rated charging voltage. In this case, the control device keeps the output voltage of the DC-DC converter at the voltage one step lower than the voltage at the time point of the case. In other words, when the power supply capacity of the input power supply is insufficient and the voltage of the input power supply is decreased to the first threshold voltage or less, the charging voltage is set at the voltage that is lower than the rated charging voltage and charging of the secondary battery is performed, so that the charging current of the secondary battery is limited to the current which is lower than the maximum charging current.

When the power supply capacity of the input power supply is decreased in this way, charging of the secondary battery can be continued by keeping the charging voltage of a minimum necessary voltage or more, although the charging time period increases correspondingly to the amount of decrease in the power consumed by charging of the secondary battery. This can reduce the possibility that when the power supply capacity of the input power supply is decreased, the charging voltage of the secondary battery decreases below the minimum necessary voltage and charging of the secondary battery has to be interrupted, so that even if the power supply capacity of the input power supply fluctuates, charging of the secondary battery can be continued.

In other words, the charging device according to the present disclosure has a simple configuration in which when the power supply capacity of the input power supply is decreased, the output voltage of the DC-DC converter is set to be variable in response to decrease of the voltage of the input power supply so that the charging current of the secondary battery is limited to the current which is lower than the maximum charging current. Therefore, the charging device according to the present disclosure can configure the charging device that can continue charging of the secondary battery even when the power supply capacity of the input power supply fluctuates, to be compact at low cost. Further, the charging device according to the present disclosure has the configuration in which the output voltage of the DC-DC converter is set to be variable in response to decrease of the voltage of the input power supply, so that a resistor and a circuit that detect the charging current are not required. Therefore, component cost can be significantly reduced.

Consequently, according to the first aspect of the present disclosure, an operational effect of being able to realize compactification and reduction in cost of the charging device capable of continuing charging of the secondary battery even when the power supply capacity of the input power supply fluctuates is obtained. Further, according to the present disclosure, a loss that is caused by the resistor that detects the charging current can also be reduced, so that the charging device with higher efficiency can be realized.

A second aspect of the present disclosure is, in the first aspect of the present disclosure described above, the charging device, wherein the control device increases the output voltage of the DC-DC converter by a predetermined voltage in a stepwise manner on condition that the voltage of the input power supply increases to a second threshold voltage higher than the first threshold voltage or more, in a state where the output voltage of the DC-DC converter is kept at a voltage lower than the rated charging voltage.

When the power supply capacity of the input power supply is insufficient and the voltage of the input power supply is decreased to the first threshold voltage or less, the charging voltage is set at the voltage lower than the rated charging voltage and charging of the secondary battery is performed continuously, so that the charging current of the secondary battery is limited to the current lower than the maximum charging current. When the power supply capacity of the input power supply is restored during charging and the voltage of the input power supply increases to the second threshold voltage or more, the output voltage of the DC-DC converter is increased by the predetermined voltage in the stepwise manner. Thereby, when the power supply capacity of the input power supply is restored when charging is performed by limiting the charging current of the secondary battery to the current lower than the maximum charging current, the charging current of the secondary battery increases to the maximum charging current in a stepwise manner. Consequently, according to the second aspect of the present disclosure, the secondary battery can be charged by automatically setting the charging current flexibly and properly in response to fluctuation of the power supply capacity of the input power supply.

A third aspect of the present disclosure is, in the first aspect or the second aspect of the present disclosure described above, the charging device, wherein the output voltage setting circuit includes a voltage divider circuit that divides the output voltage of the DC-DC converter, a voltage division ratio changing circuit that changes a voltage division ratio of the voltage divider circuit, and a DA converter that controls the voltage division ratio changing circuit, and the DC-DC converter controls an output voltage so that a voltage at a voltage division point of the voltage divider circuit is kept at a predetermined voltage.

According to the third aspect of the present disclosure, the output voltage of the DC-DC converter can be set to be variable with the extremely simple circuit configuration, so that in the charging device according to the present disclosure, further compactification and reduction in cost can be realized. Further, according to the third aspect of the present disclosure, the charging current of the secondary battery can be accurately determined from the digital input value of the DA converter, so that charging control of the secondary battery can be performed with high precision.

EXPLANATION OF REFERENCE SIGNS

10 Charging device
11 DC-DC converter
12 Charging circuit
13 Power supply voltage detecting circuit
14 Output voltage setting circuit
15 Charging control section
20 Secondary battery
141 Voltage divider circuit
142 Voltage division ratio changing circuit
143 DA converter

The invention claimed is:

1. A charging device, comprising:
a DC-DC converter that converts a voltage of DC power which is supplied from an input power supply;
a charging circuit that charges a secondary battery with a DC output voltage that is outputted by the DC-DC converter;
a power supply voltage detecting circuit that detects a voltage of the input power supply;
an output voltage setting circuit that sets the DC output voltage of the DC-DC converter; and
a control device that controls the charging circuit and the output voltage setting circuit, based on the voltage of the input power supply,
wherein the control device increases the DC output voltage of the DC-DC converter in a stepwise manner by successively increasing the DC output voltage by an incremental voltage step amount at successive time points while monitoring the voltage of the input power supply, and in response to the voltage of the input power supply being decreased to a first threshold voltage or less at a time point before the DC output voltage of the DC-DC converter increases to a rated charging voltage, the control device decreases the DC output voltage of the DC-DC converter to a voltage that is one incremental voltage step amount lower than the DC output voltage at the time point.

2. The charging device according to claim 1,
wherein the control device resumes increasing the DC output voltage of the DC-DC converter by the incremental voltage step amount in the stepwise manner, on condition that the voltage of the input power supply increases to a second threshold voltage which is higher than the first threshold voltage, or more, in a state where the DC output voltage of the DC-DC converter is kept at a voltage lower than the rated charging voltage.

3. The charging device according to claim 1, wherein
the output voltage setting circuit includes a voltage divider circuit that divides the DC output voltage of the DC-DC converter, a voltage division ratio changing circuit that changes a voltage division ratio of the voltage divider circuit, and a digital-to-analog (DA) converter that controls the voltage division ratio changing circuit, and
the DC-DC converter controls the DC output voltage so that a voltage at a voltage division point of the voltage divider circuit is kept at a predetermined voltage.

4. The charging device according to claim 2, wherein
the output voltage setting circuit includes a voltage divider circuit that divides the DC output voltage of the DC-DC converter, a voltage division ratio changing circuit that changes a voltage division ratio of the voltage divider circuit, and a digital-to-analog (DA) converter that controls the voltage division ratio changing circuit, and
the DC-DC converter controls the DC output voltage so that a voltage at a voltage division point of the voltage divider circuit is kept at a predetermined voltage.

* * * * *